(12) United States Patent
Mizuno

(10) Patent No.: US 8,417,009 B2
(45) Date of Patent: Apr. 9, 2013

(54) APPARATUS, METHOD, AND COMPUTER READABLE MEDIUM FOR ASSISTING MEDICAL IMAGE DIAGNOSIS USING 3-D IMAGES REPRESENTING INTERNAL STRUCTURE

(75) Inventor: Osamu Mizuno, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 81 days.

(21) Appl. No.: 13/014,295

(22) Filed: Jan. 26, 2011

(65) Prior Publication Data

US 2011/0237938 A1 Sep. 29, 2011

(30) Foreign Application Priority Data

Mar. 29, 2010 (JP) ................................. 2010-075499

(51) Int. Cl.
*G06K 9/00* (2006.01)
(52) U.S. Cl. ........ 382/131; 382/128; 382/134; 382/173; 128/920; 128/922
(58) Field of Classification Search .................. None
See application file for complete search history.

(56) References Cited

U.S. PATENT DOCUMENTS

| 7,715,608 | B2 | 5/2010 | Vaz et al. | |
|---|---|---|---|---|
| 7,869,640 | B2 * | 1/2011 | Yamagata et al. | 382/128 |
| 7,876,939 | B2 * | 1/2011 | Yankelevitz et al. | 382/128 |
| 2005/0170323 | A1 * | 8/2005 | Jarrell et al. | 434/262 |
| 2005/0207630 | A1 * | 9/2005 | Chan et al. | 382/131 |
| 2007/0092864 | A1 | 4/2007 | Reinhardt | |
| 2007/0230763 | A1 * | 10/2007 | Matsumoto et al. | 382/131 |
| 2008/0015418 | A1 * | 1/2008 | Jarrell et al. | 600/300 |
| 2008/0170771 | A1 * | 7/2008 | Yamagata et al. | 382/128 |
| 2011/0093243 | A1 * | 4/2011 | Tawhai et al. | 703/2 |
| 2011/0103657 | A1 * | 5/2011 | Kang et al. | 382/128 |

FOREIGN PATENT DOCUMENTS

| JP | 2005-028121 | 2/2005 |
|---|---|---|
| JP | 2008-253293 | 10/2008 |

OTHER PUBLICATIONS

Clatz et al., "Realistic Simulation of the 3-D Growth of Brain Tumors in MR Images Coupling Diffusion With Biomechanical Deformation", Oct. 2005, IEEE, vol. 24, No. 10, p. 1334.*
Alarcon et al., "A Multiple Scale Model for Tumor Growth", 2005 Society for Industrial and Applied Mathematics, vol. 3, No. 2, pp. 440-475.*
European Search Report in corresponding European Application No. 11 15 2082, Jul. 8, 2011.

(Continued)

*Primary Examiner* — Matthew Bella
*Assistant Examiner* — Jason Heidemann
(74) *Attorney, Agent, or Firm* — Young & Thompson

(57) ABSTRACT

A lesion area detection unit detects an abnormal peripheral structure (lesion area), a pulmonary blood vessel extraction unit extracts a branch structure (pulmonary blood vessel) from the three-dimensional medical image, an associated blood vessel identification unit identifies an associated branch structure functionally associated with the abnormal peripheral structure based on position information of each point in the extracted branch structure, and an associated lung parenchymal area identification unit identifies an associated peripheral area (lung parenchyma) functionally associated with the identified associated branch structure based on the position information of each point in the extracted branch structure.

13 Claims, 12 Drawing Sheets

OTHER PUBLICATIONS

Christian Hansen et al:, "Intraoperative adaptation and visualization of preoperative risk analyses for oncologic liver surgery", Proceedings of SPIE, vol. 6918, 2008, pp. 691809-1-691809-10, XP055000951, ISSN: 0277-786X, DOI: 10.1117/12.770243 *abstract; figures 1,2 * *sections: 1. Introduction; 3.1 From Voxel to risk Analysis; 3.2 Intraoperative Adaptation of Risk Analysis *.

Christian Hansen et al:, Interactive determination of robust safety margins for oncologic liver surgery:, International Journal of Computer Assisted Radiology and Surgery, vol. 4, No. 5, Sep. 1, 2009, pp. 469-474, XP055000988, ISSN: 1861-6410, DOI: 10.1007/s11548-009-0359-1 *abstract; figures 1, 3, 4, 5 *.

Dirk Selle et al:, "Analysis of Vasculature for Liver Surgical Planning", IEEE Transactions on Medical Imaging, vol. 21, No. 11, Nov. 1, 2002, XP011076391, IEEE Service Center,, Piscataway, NJ, US, ISSN: 0278-0062 *abstract*.

Johannes Schwaiger et al:, "Risk analysis for intraoperative liver surgery", 2010 Annual International Conference of the IEEE Engineering in Medicine and Biology Society : (EMBC 2010); Aug. 31, 2010,-Sep. 4, 2010, pp. 410-413, XP031794652, Buenos Aires, Argentina, ISBN: 978-1-4244-4123-5.

B. Preim et al., "Resection Proposals for Oncologic Liver Surgery based on Vascular Territories", CARS 2002—H.U. Lemke, M.W. Vannier, K. Inamura, A.G. Farman, K. Doi & J.H.C. Reiber (Editors).

A. Shimizu et al., "Performance Evaluation of 3D—Enhancement Filters for Detection of Lung Cancer from 3-D Chest X-ray CT Images", Medical Imaging Technology, vol. 13, No. 6, pp. 853-864, Nov. 1995.

T. Tomida et al., "Automatic classification method of Solid and Ground Glass Opacity in Chest X-ray CT Images", IEICE Technical Report, MI2009-150(Jan. 2010), vol. 109, No. 407, pp. 397-400, Jan. 2010.

M. Kinsella et al., Quantitation of emphysema by computed tomography using a "density mask" program and correlation with pulmonary function tests, Chest 97, pp. 315-321, 1990.

D. Kobayashi et al., Trial of branch base tree structure model construction for blood vessel geometric representation, Mar. 9, 2005 RIKEN Japan, RIKEN symposium, Digitization and database construction research of organism shape information pp. 84-92.

S. Nakamura et al., Automated Classification of Pulmonary Artery and Vein, from Chest X-ray CT Images by Tree Structure Analysis, Technical Report of IEICE, MI Japan, Jan. 21, 2006, vol. 105 No. 580, pp. 105-108.

Y. Hirano et al., Quantificaiton of shrinkage of lung lobes in chest CT images using the 3D Voronoi division and application to tumor discrimination: Jul. 2001, pp. 315-316.

T. Hayashi et al., "Development of the Procedure for Automatic Extracting Interlobar Fissures and its Performance Evaluation", Techical Report of IEICE, Oct. 31, 2003. vol. 103, No. 409, pp. 39-44.

D. Rueckert et al., "Nonrigid Registration Using Free-Form Deformations: Application to Breast MR Images", IEEE Transactions on Medical Imaging, vol. 18, No. 8, pp. 712-721, Aug. 1999.

* cited by examiner

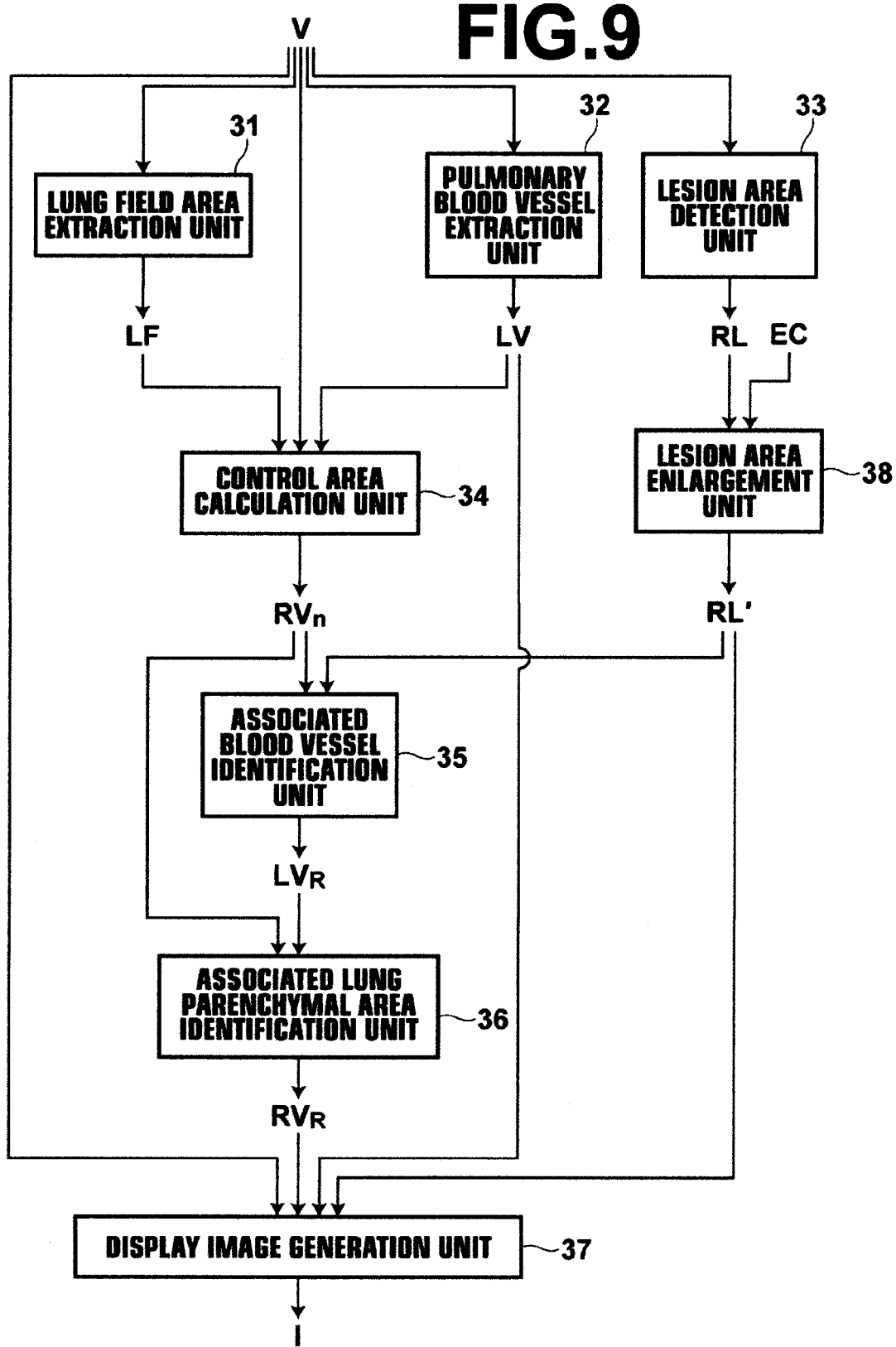

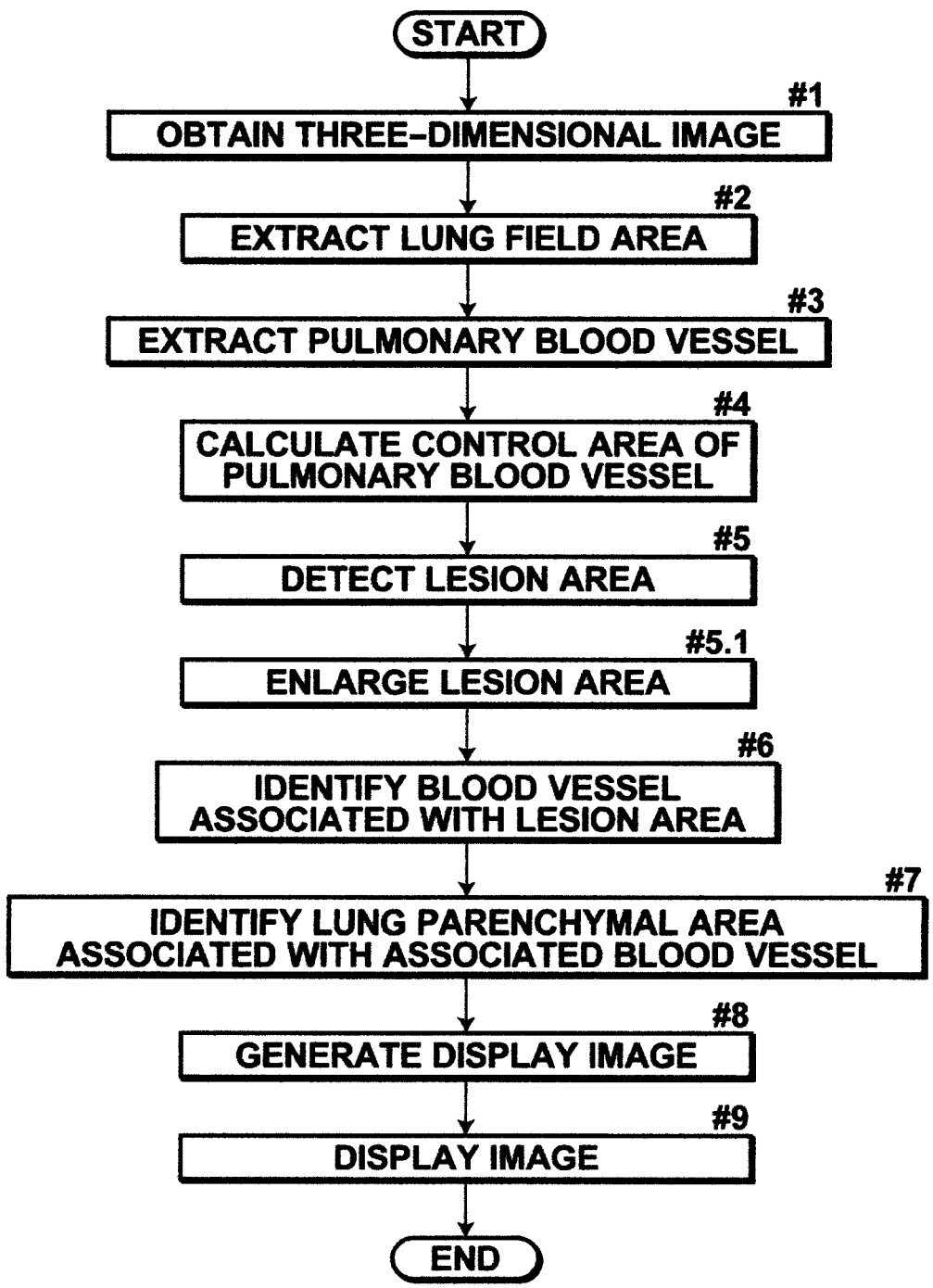

APPARATUS, METHOD, AND COMPUTER READABLE MEDIUM FOR ASSISTING MEDICAL IMAGE DIAGNOSIS USING 3-D IMAGES REPRESENTING INTERNAL STRUCTURE

BACKGROUND OF THE INVENTION

1. Field of the Invention

The present invention relates to an apparatus and method for assisting image diagnosis using a three-dimensional medical image representing a subject's internal structure constituted by branch and peripheral structures, such as a lung. The invention also relates to a computer readable recording medium on which is recorded a program for the same.

2. Description of the Related Art

As a technology for assisting image diagnosis using a three-dimensional medical image representing a chest obtained by a CT device, a technology that automatically detects an abnormal opacity, such as lung cancer and the like, from the three-dimensional medical image is known.

For example, a method of detecting lung cancer opacity from a three-dimensional CT image representing a chest using a two-dimensional N-Quoit filter, a variable neighborhood type Laplacian filter, a Min-DD filter, and a contrast filter, each extended to three-dimensions, is known as described, for example, in a literature "Performance Evaluation of 3-D Enhancement Filters for Detection of Lung Cancer from 3-D Chest X-ray CT Images", by A. Shimizu et al., Medical Imaging Technology, Vol. 13, No. 6, pp. 853-864, November 1995 (Non-patent Document 1).

Further, a method of automatically classifying nodular opacities into solid nodules and ground glass opacities is proposed as described, for example, in a literature "Automatic classification method of Solid and Ground Glass Opacity in Chest X-ray CT Images" by T. Tomida et al., IEICE Technical Report, MI2001-150 (2010-01), Vol. 109, No. 407, pp. 397-400, January 2010 (Non-patent Document 2). The method achieves the automatic classification by dividing a detected pulmonary nodular opacity into a nucleus and a periphery through gray value threshold processing or contrast evaluation, obtaining the ratio of the nucleus in the opacity as a characteristic amount, in addition to characteristic amounts with respect to the volume, sphericity, horizontal to vertical ratio, average gray value, and the like, and performing a canonical discriminant analysis.

As for a method of detecting a lesion area other than lung cancer, a method that detects an area of lung fields where pixel values are less than a predetermined threshold value (threshold value of −960 HU for a non-contrast enhanced CT image) as an emphysema area is known, as described for example, in a literature "Quantitation of emphysema by computed tomography using a "density mask" program and correlation with pulmonary function tests" by M. Kinsella et al., Chest, 97, pp. 315-321, 1990 (Non-patent Document 3).

Further, a method in which lung parenchymal tissue in a CT image of lungs is segmented, then a perfusion map of the segmented image is generated, and an abnormally underperfused area is detected is known as described, for example, in U.S. Pat. No. 7,715,608 (Patent-document 1).

In an actual medical site, when a detection result for lesion from an image and other examination results are comprehensively evaluated and a definitive diagnosis is established that the lesion is a certain disease, the lesion is resected, removed, or cauterized. Here, in order to preserve, as much as possible, the function of the organ in which the lesion is found after the treatment, the treatment target area should be limited as small as possible. On the other hand, if the target area is not large enough, a portion of the lesion may remain and a metastasis may possibly occur. Thus, it is necessary to appropriately determine the treatment target area before treating the affected area.

The method described in each of Non-patent Documents, however, only detects an abnormal area in lung fields and the documents do not describe at all how to assist in determining the treatment target area when a certain treatment needs to be performed on the abnormal area.

The present invention has been developed in view of the circumstances described above, and it is an object of the present invention to provide an apparatus and method capable of identifying a necessary and sufficient treatment target area for an abnormal area when an image diagnosis is performed using a three-dimensional medical image representing an inner structure of a subject constituted by branch and peripheral structures. It is a further object of the present invention to provide a computer readable recording medium on which is recorded a program for the same.

SUMMARY OF THE INVENTION

A medical image diagnosis assisting apparatus of the present invention is an apparatus, including:

an abnormal peripheral structure detection means for detecting, from a three-dimensional medical image representing a subject's internal structure having a branch structure and a peripheral structure which is a structure located in a periphery of the branch structure and functionally associated with the branch structure, an abnormal peripheral structure which is an abnormal portion of the peripheral structure;

a branch structure extraction means for extracting the branch structure from the three-dimensional medical image;

an associated branch structure identification means for identifying a portion of the branch structure functionally associated with the abnormal peripheral structure as an associated branch structure based on position information of each point in the extracted branch structure; and an associated peripheral structure identification means for identifying a portion of the peripheral structure functionally associated with the identified associated branch structure as an associated peripheral structure based on the position information of each point in the extracted branch structure.

A medical image diagnosis assisting method of the present invention is a method, including the steps of:

detecting, from a three-dimensional medical image representing a subject's internal structure having a branch structure and a peripheral structure which is a structure located in a periphery of the branch structure and functionally associated with the branch structure, an abnormal peripheral structure which is an abnormal portion of the peripheral structure;

extracting the branch structure from the three-dimensional medical image;

identifying a portion of the branch structure functionally associated with the abnormal peripheral structure as an associated branch structure based on position information of each point in the extracted branch structure; and identifying a portion of the peripheral structure functionally associated with the identified associated branch structure as an associated peripheral structure based on the position information of each point in the extracted branch structure.

A computer readable recording medium on which is recorded a medical image diagnosis assisting program of the present invention is a medium having a program recorded thereon for causing a computer to perform the method described above.

The term "branch structure" as used herein refers to a subject's internal structure having a branching structure. Specific examples include a blood vessel, a bronchus, and the like.

The term "peripheral structure" as used herein refers to a structure that performs, with the branch structure, a certain function of the subject's internal structure. A specific example of the "certain function" may be an exchange, between the peripheral structure and branch structure, of a given substance carried by a fluid flowing through the branch structure.

Specific examples of "subject's internal structure" include a lung, a liver, and the like. In the case of a lung, the branch structure may be a blood vessel or a bronchus and the peripheral structure may be a lung parenchyma. The pulmonary blood vessel may be either one of the pulmonary artery and pulmonary vein. In the case of a liver, the branch structure may be a blood vessel and the peripheral structure may be a liver parenchyma. The hepatic blood vessel may be any one of the hepatic artery, hepatic vein, and hepatic portal.

The method of "detecting an abnormal peripheral structure" may be a method that performs detection based on a manual user operation in an image generated from a three-dimensional medical image, a method that performs automatic detection using an image analysis and recognition process, or a method that combines the two methods. Specific examples of the combined method may include a method in which a reference point (e.g., an arbitrary point in a lesion area) is specified by a manual user operation and a predetermined image analysis and recognition process is performed based on the reference point, thereby automatically extracting an abnormal peripheral structure, a method in which an abnormal peripheral structure candidate is automatically extracted by a predetermined image analysis and recognition process and an abnormal peripheral structure is detected through selection or correction of the abnormal peripheral structure candidate by a manual user operation. Further, an arrangement may be adopted in which an abnormal portion of the peripheral structure is detected in advance from an image obtained at a different imaging timing, an image captured by a different modality, or the like (different image), then a positional alignment is performed between the different image and the three-dimensional medical image to align the position of the internal structure of the subject, and based on the positional alignment result, a portion of the three-dimensional medical image corresponding to the abnormal portion of the peripheral structure in the different image is detected as the abnormal peripheral structure.

In the present invention, prior to the identification of the associated branch structure and associated peripheral structure, a point in the branch structure functionally associated with each point in the peripheral structure may be identified based on the position information of each point in the extracted branch structure, and the associated branch structure and associated peripheral structure may be detected based on the identified functional correspondence between each point in the peripheral structure and each point in the branch structure.

Further, the abnormal peripheral structure may be enlarged according to a given growth condition representing a degree of future growth of the abnormal peripheral structure, and a portion of the branch structure functionally associated with the abnormal peripheral structure after the enlargement is identified as the associated branch structure. Alternatively, the portion of the branch structure functionally associated with the abnormal peripheral structure may be extended to the proximal side of the branch structure according to the given growth condition and the portion after the extension is identified as the associated branch structure.

Still further, the given growth condition may represent a plurality of growth steps, the abnormal peripheral structure may be enlarged with respect to each growth step, the associated branch structure may be identified with respect to each growth step, the associated peripheral structure may be identified with respect to each growth step, and one or more images, which represent at least the associated peripheral structure and the associated branch structure, and indicate a change in the associated peripheral structure between each of the growth steps in a visually recognizable manner, may be generated from the three-dimensional medical image. Here, the one or more images may further indicate a change in the abnormal peripheral structure between each of the growth steps in a visually recognizable manner.

In the present invention, a portion of the peripheral structure functionally associated with the portion of the branch structure functionally associated with the abnormal peripheral structure and a portion of the branch structure on the distal side of the portion functionally associated with the abnormal peripheral structure may be identified as the associated peripheral structure.

Further, the subject's internal structure may include a second branch structure different from the branch structure, then the second branch structure may be detected from the three-dimensional medical image, and an intersection point between a boundary plane of the associated peripheral structure and the second branch structure may be identified. Here, an image which represents at least the associated peripheral structure, the associated branch structure, and the second branch structure adjacent to the two structures, and indicates the intersection point in a visually recognizable manner may be generated from the three-dimensional medical image.

According to the present invention, from a three-dimensional medical image representing a subject's internal structure having a branch structure and a peripheral structure, an abnormal peripheral structure is detected and the branch structure is extracted. Then, an associated branch structure functionally associated with the abnormal peripheral structure is identified based on position information of each point in the extracted branch structure and an associated peripheral structure functionally associated with the identified associated branch structure. Consequently, the associated peripheral structure includes a structure functionally associated with the associated branch structure adjacent to the abnormal peripheral structure, indicating a necessary and sufficient area as the treatment target area for the abnormal peripheral structure. Thus, the invention may contribute to an appropriate and easy decision of the treatment policy for the abnormal peripheral structure based on the associated peripheral structure.

BRIEF DESCRIPTION OF THE DRAWINGS

FIG. 9 is a block diagram schematically illustrating a configuration and a process flow for realizing a medical image diagnosis assisting function in a second embodiment of the present invention.

FIG. 10 is a flowchart illustrating a process flow for assisting medical image diagnosis using the medical image diagnosis system in the second embodiment of the present invention.

DESCRIPTION OF THE PREFERRED EMBODIMENTS

Hereinafter, taking as example the case in which lung cancer opacity is detected from a CT image representing a chest of a human body and a treatment target area for the detected lesion is considered, a medical image diagnosis system that employs a medical image diagnosis assisting apparatus according to an embodiment of the present invention will be described.

Figure 1:
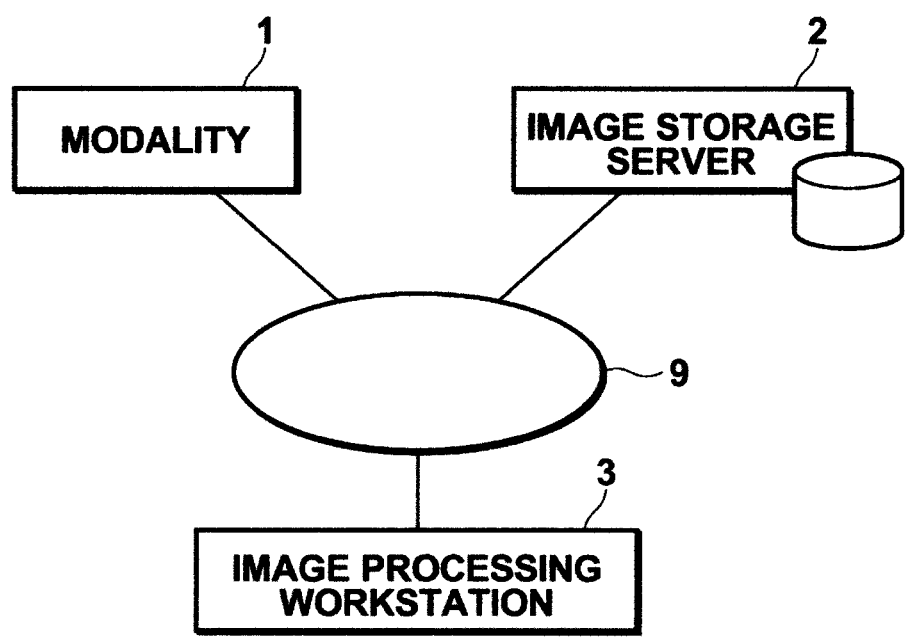
FIG. 1 is a schematic configuration diagram of a medical image diagnosis system that employs a medical image diagnosis assisting apparatus according to an embodiment of the present invention.

FIG. 1 is a hardware configuration diagram of the medical image diagnosis system, illustrating an overview thereof. As shown in FIG. 1, the system includes modality 1, image storage server 2, and image processing workstation 3 are communicatably connected to each other via network 9.

Modality 1 includes an apparatus that images an inspection target region of a subject to generate image data representing a three-dimensional medical image of the region and outputs the image data by attaching auxiliary information defined in DICOM (Digital Imaging and Communication in Medicine) standard as image information. Specific examples of the apparatus include, for example, CT, MRI, and the like. In the present embodiment, a description will be made of a case in which three-dimensional image data representing a chest of a human body to be examined are generated by scanning the human body with CT in a body axis direction.

Image storage server 2 is a computer for storing medical image data, in a database, obtained by modality 1 and image data of a medical image generated by image processing in image processing workstation 3 and managing them, and includes a large capacity external memory unit and database management software (e.g., Object Relational Database (ORDB)).

Image processing workstation 3 is a computer that performs, in response to a request from a radiology reader, image processing (including image analysis) on medical image data obtained from modality 1 or image storage server 2 and displays a generated image. It is provided with known hardware devices, such as a CPU, a main storage unit, an auxiliary storage unit, an input/output interface, a communication interface, input devices (mouse, keyboard, and the like), a display device (display monitor), a data bus, and the like, and has a known operating system installed thereon. The medical image diagnosis assisting process is implemented in the image processing workstation 3 and the process is realized by executing a program installed from a recording medium, such as a CD-ROM or the like. Alternatively, the program may be a program installed after being downloaded from a storage unit of a server connected via a network, such as Internet or the like.

The storage format of image data and communication between each component of the system are based on the DICOM protocol or the like.

Figure 2:
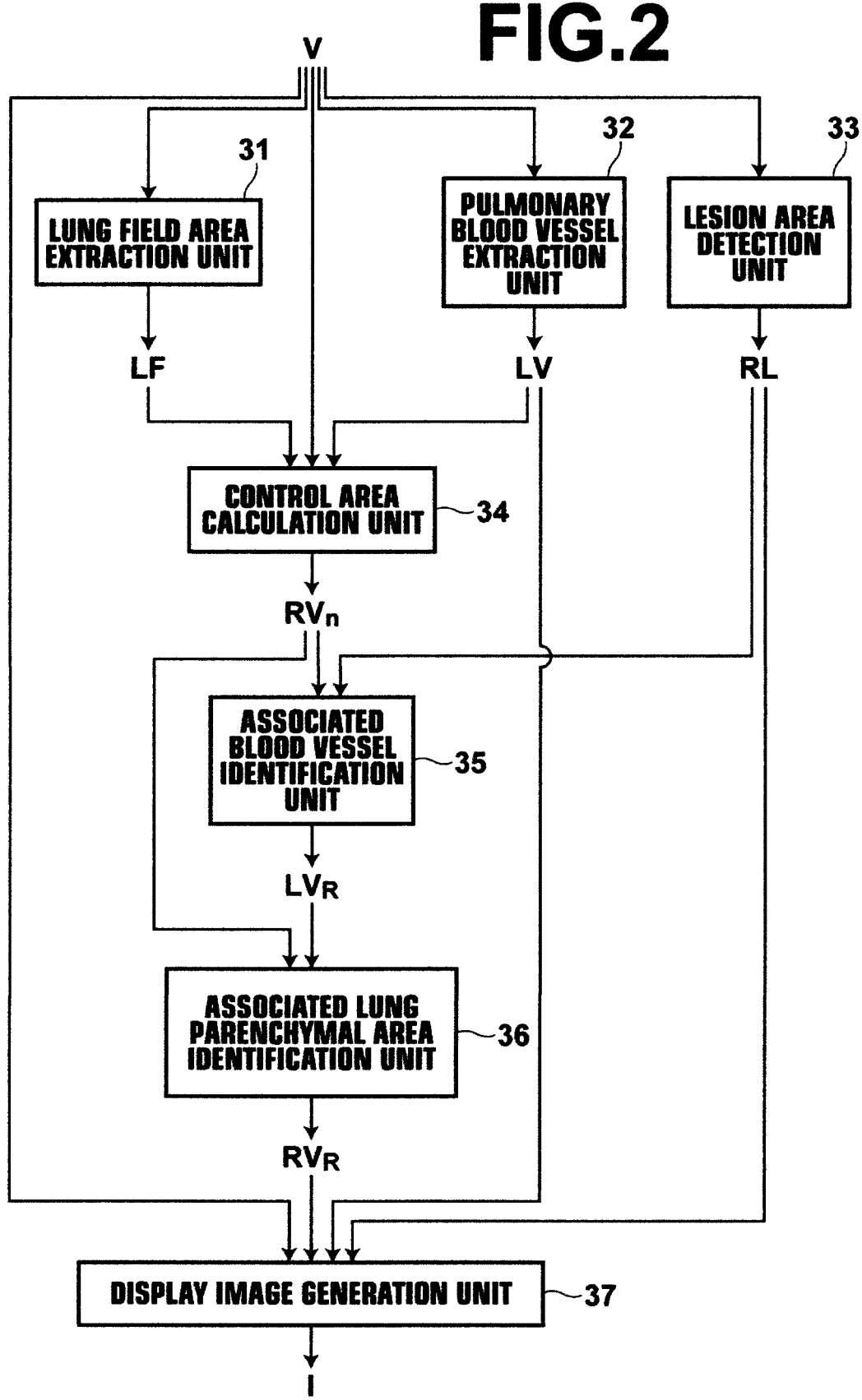
FIG. 2 is a block diagram schematically illustrating a configuration and a process flow for realizing a medical image diagnosis assisting function in a first embodiment of the present invention.

FIG. 2 is a block diagram illustrating a portion of the function of image processing workstation 3 relevant to the medical image diagnosis assisting process according to the first embodiment of the present invention. As shown in FIG. 2, the medical image diagnosis assisting process according to the first embodiment of the present invention is realized by lung field area extraction unit 31, pulmonary blood vessel extraction unit 32, lesion area detection unit 33, control area calculation unit 34, associated blood vessel identification unit 35, associated lung parenchymal area identification unit 36, and display image generation unit 37. In FIG. 2, the three-dimensional medical image V, lung field area LF, pulmonary blood vessel structure LV, lesion area RL, control area of each blood vessel $RV_n$, associated blood vessel structure $LV_R$, associated lung parenchymal area $RV_R$, and display image I are data written into and read out from a predetermined memory area of image processing workstation 3 by each of the processing units described above.

Lung field area extraction unit 31 extracts a lung field area LF of a subject using each of a plurality of axial cross-sectional images constituting a three-dimensional image V as input. For example, as the lung field area LF is an area having a pixel value corresponding to the CT value of air, an air area in a subject may be extracted as the lung field area after discriminating between the air area around the subject and the subject area by performing threshold processing on each axial cross-sectional image.

Pulmonary blood vessel extraction unit 32 extracts a pulmonary blood vessel structure LV of the subject using the three-dimensional medical image V as input. More specifically, based on an arbitrary seed point set by the user, region growing is performed to extract a mass of pixels within a pulmonary blood vessel area, then a thinning process is performed on the extracted pulmonary blood vessel area, and based on the obtained thin line representing a blood vessel, each pixel on the thin line is classified into an end point, an edge (side), or a branching point, whereby tree-structure data representing the pulmonary blood vessel can be obtained. Further, characteristic amounts, such as blood vessel diameter at each pixel on the thin line, length of each edge (branch blood vessel), and the like, may also be stored as the tree-structure data, as required. (For details, refer to the following which are hereinafter collectively referred to as Reference Document 1: "Trial of branch base tree structure model construction for blood vessel geometric representation" by D. Kobayashi et al., [Online], Mar. 9, 2005, RIKEN, Japan, RIKEN symposium, Digitization and database construction research of organism shape information, pp. 84-92, [Date of Retrieval: Jan. 6, 2010], Internet <URL:http://www.comp-bio.riken.jp/keijyo/products/2005_1_files/kobayashi_print.pdf>; "Automated Classification of Pulmonary Artery and Vein from Chest X-ray CT Images by Tree Structure Analysis" by S. Nakamura et al., Technical Report of IEICE, MI, Japan, Jan. 21, 2006, Vol. 105, No. 580, pp. 105-108, [Date of Retrieval: Nov. 20, 2009], Internet <URL:http://www.murase.nuie.nagoya-u.ac.jp/ide/res/paper/J05-kenkyukai-snake-1.pdf>.)

Lesion area detection unit 33 extracts a lung cancer lesion area RL from the three-dimensional medical image V. As for the specific detection method, the automatic detection method described in Non-patent Document 1 or Non-patent Document 2 is used. Here, lesion area detection unit 33 may provide a user interface for allowing the user (radiologist or diagnostician) to visually confirm lung cancer opacity detected by one of the methods described above, determine whether the opacity is true or not, and correct the extent of the opacity, thereby extracting only true opacity after the determination and correction as the lesion area RL.

Figure 4:
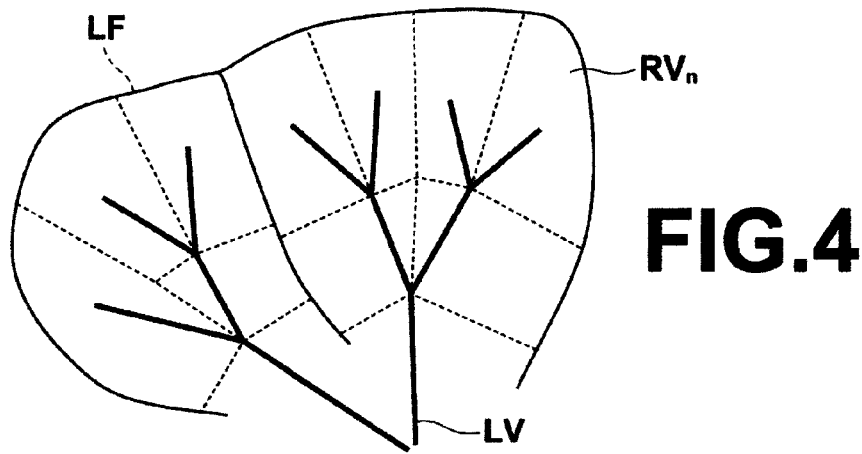
FIG. 4 schematically illustrates a control area of each pulmonary branch blood vessel.

Control area calculation unit 34 identifies, based on the positional relationship between each point in a pulmonary blood vessel structure LV, a point in the pulmonary blood vessel structure LV functionally associated with each point of a lung parenchymal area in a lung field area LF. That is, control area calculation unit 34 identifies the functional association between each point in the pulmonary blood vessel structure and lung parenchymal area. More specifically, control area calculation unit 34 performs three-dimensional Voronoi division using the pulmonary blood vessel structure LV as the kernel point mass to obtain a control area $RV_n$ of each branch blood vessel constituting the pulmonary blood vessel structure LV. As schematically illustrated in FIG. 4, control area calculation unit 34 identifies one of the branch blood vessels constituting the pulmonary blood vessel structure LV located closest to each pixel in the lung field area LF, that is, identifies by which branch blood vessel each pixel in the lung field area LF is controlled. As a result, an area controlled by the same branch blood vessel is determined to be the control area of the branch blood vessel. The data structure of control area $RV_n$ is such that a label identifying a branch blood vessel controlling each point in the lung field area LF is associated. (For details, refer to "Quantification of shrinkage of lung lobes in chest CT images using the 3D Voronoi division and application to tumor discrimination" by Y. Hirano et al., [Online], July 2001, JMIT $20^{th}$ annual meeting proceedings, pp. 315-316, [Date of Retrieval: Nov. 20, 2009], Internet <URL: http://mase.itc.nagoya-u.ac.jp/hirano/Papers/JAMIT2001.pdf>.) In the present embodiment, it is assumed that gas exchange takes place between the lung parenchymal area in each control area $RV_n$ and the branch blood vessel of pulmonary blood vessel structure, and a treatment target lung parenchymal area for a lesion area is identified.

Figure 5:
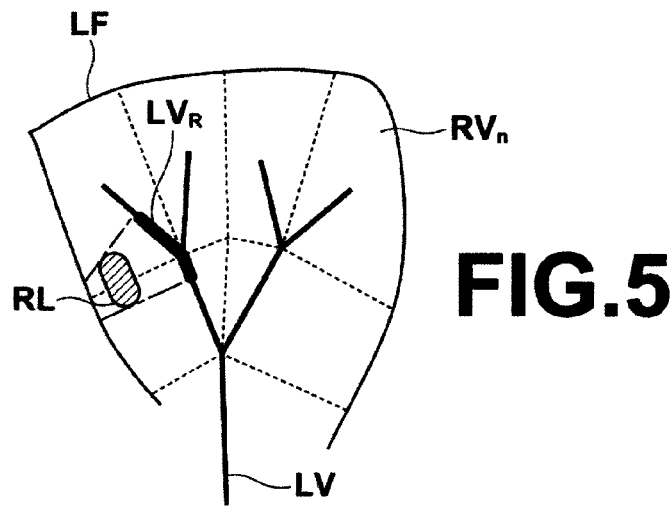
FIG. 5 schematically illustrates processing for identifying a blood vessel associated with a lesion area.
Figure 7:
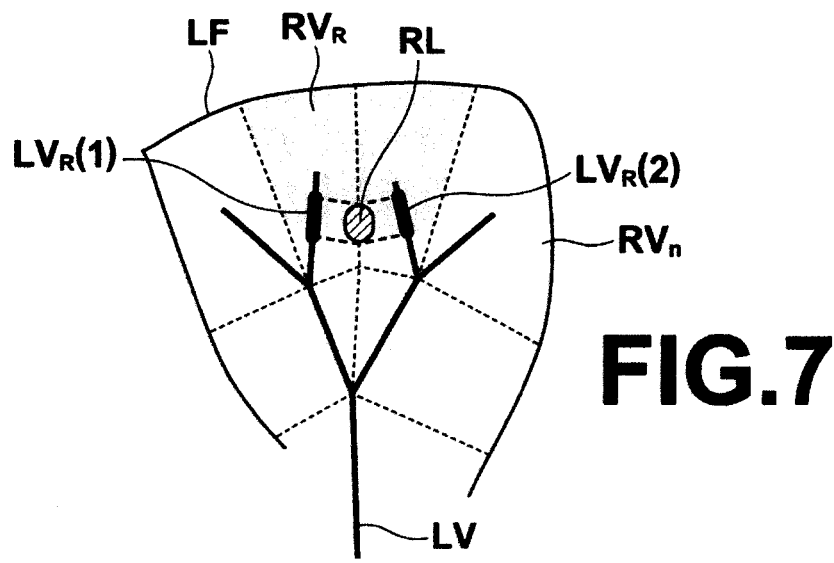
FIG. 7 schematically illustrates processing for identifying associated blood vessels and associated lung parenchymal areas when a plurality of blood vessels is associated with a lesion area.

As schematically illustrated in FIG. 5, associated blood vessel identification unit 35 identifies an associated blood vessel structure $LV_R$, which is a portion of the pulmonary blood vessel structure LV functionally associated with the lesion area RL in the lung parenchymal area of lung filed area LF based on the information of control area $RV_n$. More specifically, a blood vessel mass in the pulmonary blood vessel structure LV which can be identified by a label associated with each point of the lesion area RL is identified as the associated pulmonary blood vessel structure $LV_R$. As illustrated in FIG. 7, when the lesion area RL is controlled by a plurality of branch blood vessels not connected directly to each other, a plurality of associated blood vessel structures $LV_R$ (1) $LV_R$ (2) are identified in the similar manner to that described above.

Figure 6:
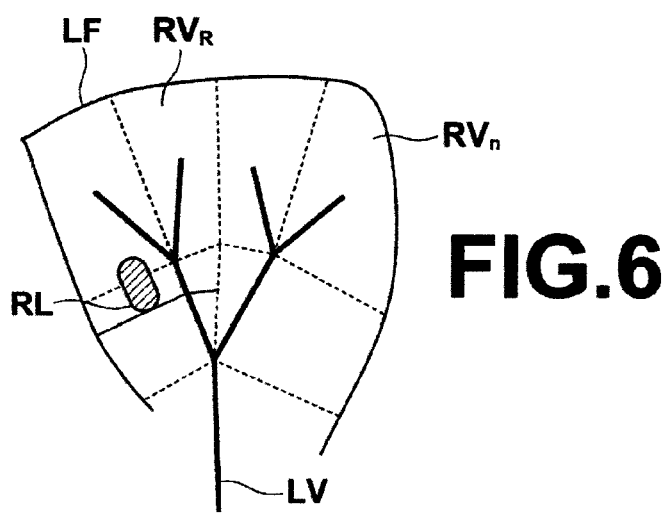
FIG. 6 schematically illustrates processing for identifying a lung parenchymal area associated with the lesion-area-associated blood vessel.

Associated lung parenchymal area identification unit 36 identifies an associated lung parenchymal area $RV_R$, which is a lung parenchymal area functionally associated with the associated pulmonary blood vessel structure $LV_R$ based on the information of control area $RV_n$. The associated lung parenchymal area $RV_R$ is an area recognized by the user as the lung parenchymal area affected by a portion of the pulmonary blood vessel structure LV to be resected with the lesion area RL as the treatment of the lesion area RL. Accordingly, as schematically illustrated in FIG. 6, the pulmonary blood vessel structure located in the distal side of the associated pulmonary blood vessel structure $LV_R$ is also removed by the resection, thus the associated lung parenchymal area $RV_R$ is a lung parenchymal area functionally associated with the pulmonary blood vessel structure from the associated pulmonary blood vessel structure $LV_R$ to the periphery. When two associated pulmonary blood vessel structures $LV_R$ (1), $LV_R$ (2) are identified, as schematically illustrated in FIG. 7, a union of a lung parenchymal area functionally associated with the pulmonary blood vessel structure from each of the associated pulmonary blood vessel structure to the periphery is identified as the associated lung parenchymal area $RV_R$ in the similar manner to that described above. More specifically, associated lung parenchymal area identification unit 36 identifies a mass of each point in the lung field area LF associated with the label identifying a branch blood vessel constituting the pulmonary blood vessel structure from the associated pulmonary blood vessel structure $LV_R$ to the periphery as the associated lung parenchymal area $RV_R$.

As schematically illustrated in FIGS. 6 and 7, display image generation unit 37 generates, from the three-dimensional medical image V, a display image I which represents an area including the lesion area RL, a pulmonary blood vessel structure from the associated pulmonary blood vessel structure $LV_R$ to the periphery and an adjacent pulmonary blood vessel structure, and the associated lung parenchymal area $RV_R$, in which the lesion area RL and the associated lung parenchymal area $RV_R$ are represented in an identifiable manner. More specifically, mask data representing each of lesion area RL, pulmonary blood vessel structure from the associated pulmonary blood vessel structure $LV_R$ to the periphery and an adjacent pulmonary blood vessel structure, and associated lung parenchymal area $RV_R$, and a template that defines color or opacity of each of them are provided in advance. Then, using the mask data and template, a known volume rendering process is performed on the three-dimensional medical image V and ray casting is performed on each area masked by the mask data with a color or opacity allocated to the structure of each masked area, whereby the display image I is generated.

Figure 3:
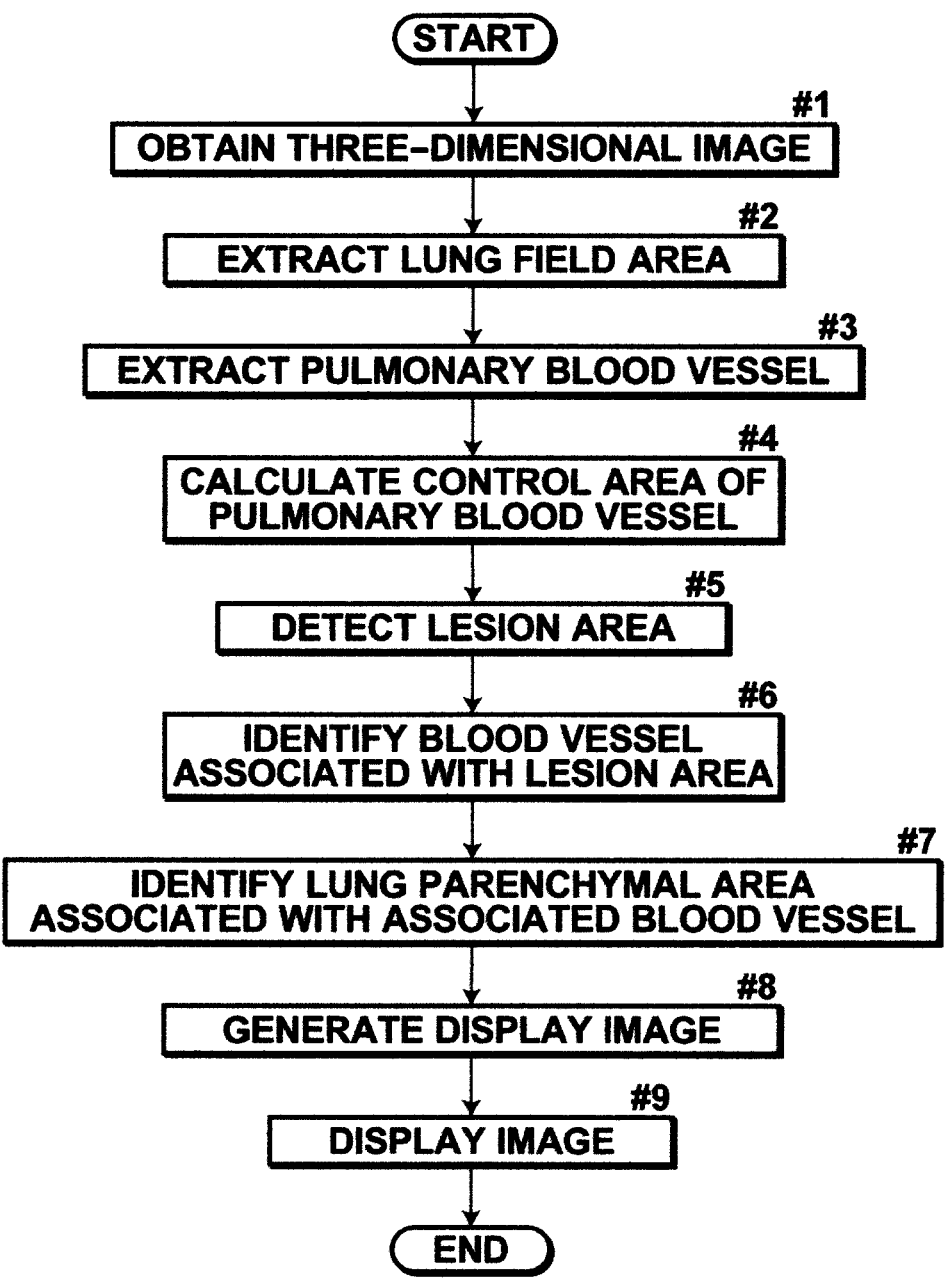
FIG. 3 is a flowchart illustrating a process flow for assisting medical image diagnosis using medical image diagnosis system in the first embodiment of the present invention.

A flow of image diagnosis using the medical image diagnosis assisting process of the first embodiment of the present invention will now be described. FIG. 3 is a flowchart illustrating a flow of user operation, calculation processing, display processing, and the like performed under the execution of medical image diagnosis assisting software according to the first embodiment of the present invention.

First, image data of a three-dimensional medical image V is obtained (#1). The three-dimensional medical image V is an image captured by modality 1 and stored in image storage server 2 based on an examination order from a doctor of a requesting department. The user makes a request for obtaining a processing target three-dimensional medical image data V by operating a terminal operation interface of a known ordering system implemented in image processing workstation 3. In response to the operation, image processing workstation 3 sends a request for retrieval of the three-dimensional medical image data V to image storage server 2. Then, image storage server 2 obtains the processing target three-dimensional medical image data V by performing database searching and sends the data to image processing workstation 3. Image processing workstation 3 obtains the three-dimensional medical image data V sent from image storage server 2.

In image processing workstation 3, lung field area extraction unit 31 extracts a lung field area LF of the subject using each of a plurality of axial cross-sectional images constituting the three-dimensional medical image V as input (#2) and pulmonary blood vessel extraction unit 32 extracts a pulmonary blood vessel structure LV using the three-dimensional medical image V as input (#3). Then, using the three-dimensional medical image V as input, control area calculation unit 34 obtains a control area $RV_n$ with respect to each branch blood vessel constituting the pulmonary blood vessel structure LV based on the lung field area LF extracted by lung field area extraction unit 31 and the pulmonary blood vessel structure LV extracted by pulmonary blood vessel extraction unit 32 (#4). In the mean time, lesion area detection unit 33 detects a lesion area RL using the three-dimensional medical image V as input (#5).

Here, associated blood vessel identification unit 35 identifies an associated blood vessel structure $LV_R$, which is a portion of the pulmonary blood vessel structure LV functionally associated with the lesion area RL in the lung parenchymal area of lung filed area LF based on the information of control area $RV_n$ (#6), and associated lung parenchymal area identification unit 36 identifies an associated lung parenchymal area $RV_R$, which is a lung parenchymal area functionally associated with a pulmonary blood vessel structure from the associated pulmonary blood vessel structure $LV_R$ to the periphery based on the information of control area $RV_n$ (#7).

Then, display image generation unit 37 generates a display image I in which the lesion area RL and associated lung parenchymal area $RV_R$ are represented in an identifiable manner from the three-dimensional medical image V (#8). The generated display image I is displayed on the display device of image processing workstation 3 (#9).

In the first embodiment of the present invention, an associated lung parenchymal area $RV_R$ functionally associated with a pulmonary blood vessel structure located in the distal side of the associated pulmonary blood vessel structure $LV_R$ is identified by the series of process steps described above. The associated lung parenchymal area $RV_R$ represents a necessary and sufficient area as the target area for treating the lesion area RL, so that treatment policy for the lesion area RL can be determined appropriately and easily based on the associated lung parenchymal area $RV_R$.

Figure 8:
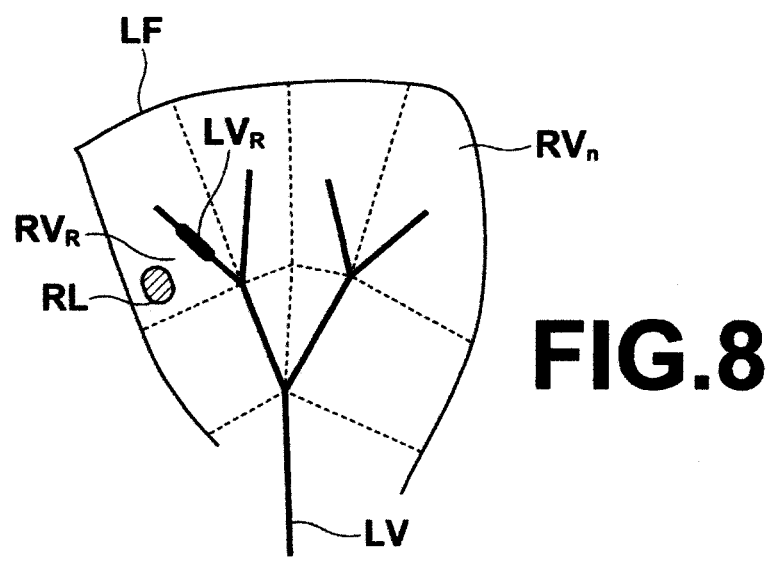
FIG. 8 schematically illustrates another example of processing for identifying an associated blood vessel and an associated lung parenchymal area based on a lesion area.

In the embodiment described above, the description has been made on the assumption that an associated pulmonary blood vessel structure $LV_R$ is also removed with the resection of a lesion area RL. But associated lung parenchymal area identification unit 36 may be a unit that identifies a lung parenchymal area associated only with an associated pulmonary blood vessel structure $LV_R$ associated with a lesion area RL as the associated lung parenchymal area $RV_R$, depending on the various circumstances including the lesion type and progression, treatment method, and the like, as schematically illustrated in FIG. 8.

FIG. 9 is a block diagram illustrating a portion of the function of image processing workstation 3 relevant to the medical image diagnosis assisting process according to a second embodiment of the present invention. As shown in FIG. 9, the structure of the second embodiment of the present invention is identical to that of the first embodiment, except that lesion area enlargement unit 38 is additionally provided.

Lesion area enlargement unit 38 is a unit that generates an enlarged lesion area RL' obtained by enlarging a lesion area RL according to a growth condition EC representing a degree of future growth of the lesion area RL. Here, the growth condition EC is an enlargement factor of the lesion area RL and may be given as a startup parameter or may be obtained by reading from a setting file. Alternatively, the growth condition EC may be defined in advance as a parameter representing an enlargement speed and the enlargement factor is calculated according to an inputted value of elapsed time (e.g., number of months elapsed) by the user. Further, a plurality of patterns may be defined for the growth condition EC according to lesion types and the like.

FIG. 10 is a flowchart illustrating a flow of medical image diagnosis assisting process according to the second embodiment of the present. As shown in FIG. 10, step #1 to step #5 are identical to those of the first embodiment. After a lesion area RL is detected by lesion area detection unit 33 in step #5, lesion area enlargement unit 38 generates an enlarged lesion area RL' obtained by enlarging the lesion area RL (#5.1). Then, associated blood vessel identification unit 35 identifies an associated pulmonary blood vessel structure $LV_R$ functionally associated with the enlarged lesion area RL' (#6). The onward processing steps are identical to those of the first embodiment, except that the enlarged lesion area RL' is used instead of the lesion area RL.

In the second embodiment of the present invention, lesion area enlargement unit 38 enlarges a lesion area RL of a size when detected by lesion area detection unit 33 and an associated pulmonary blood vessel structure $LV_R$ and an associated lung parenchymal area $RV_R$ are identified based on the enlarged lesion area RL'. This allows the treatment target area for the lesion to be considered by predicting the growth of the lesion area RL.

Figure 11A:
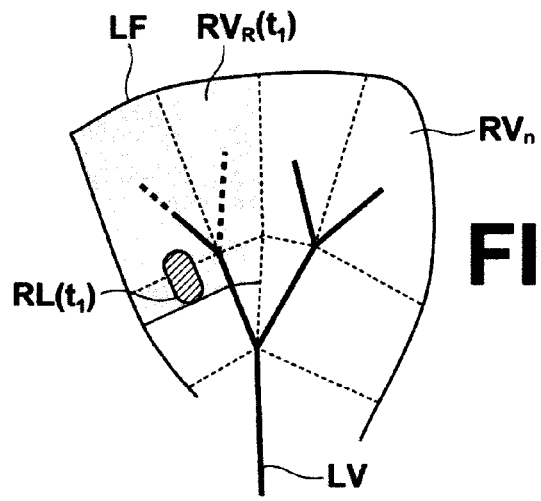
FIG. 11A schematically illustrates a lesion area and an associated lung parenchymal area at a time point t1.
Figure 11B:
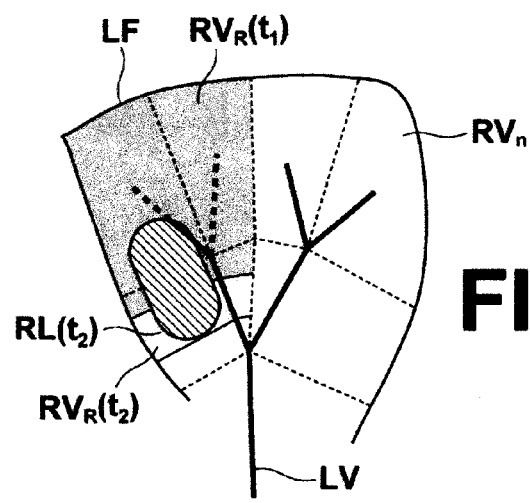
FIG. 11B schematically illustrates a lesion area and an associated lung parenchymal area at a time point t2.
Figure 11C:
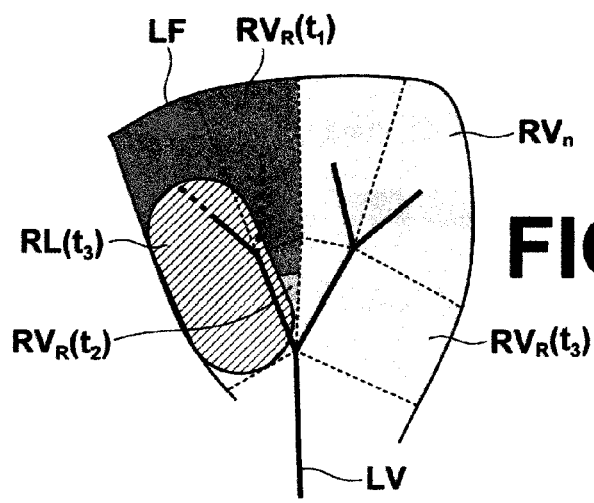
FIG. 11C schematically illustrates a lesion area and an associated lung parenchymal area at a time point t3.
Figure 12:
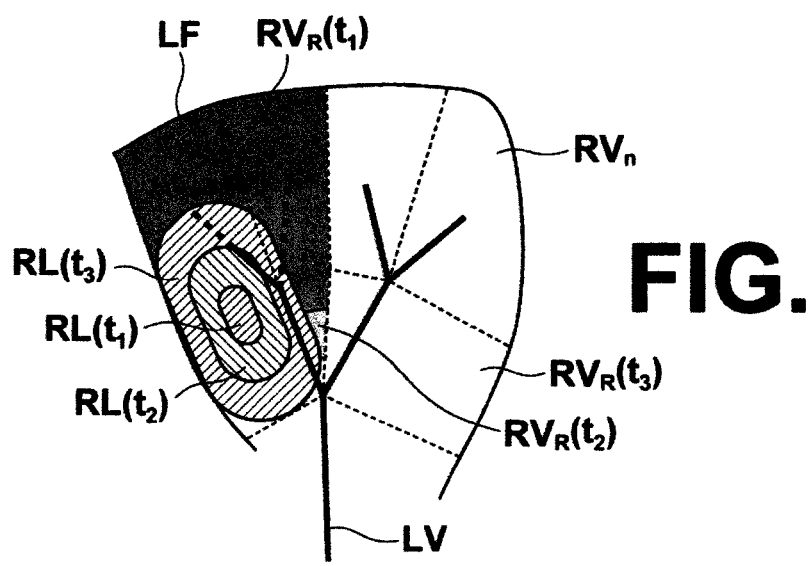
FIG. 12 schematically illustrates an example of display image indicating expansion of an associated lung parenchymal area with the expansion of a lesion area.

Further, the growth condition EC can be defined in a reference table with respect to each of a plurality of time points according to the elapsed time from the present time. In this case, in the flowchart of FIG. 10, steps #5.1 to #7 are repeated by the number corresponding to the plurality of time points. FIGS. 11A to 11C schematically illustrate display images, each representing a lesion area and an associated lung parenchymal area at each of a plurality of time points. FIG. 11A shows the state of present time $t_1$, FIG. 11B shows the state of present time $t_2$, and FIG. 11C shows the state of present time $t_3$. That is, FIGS. 11A to 11C show that the lesion area RL grows over time, like RL $(t_1)$<RL $(t_2)$<RL $(t_3)$, so does the associated lung parenchymal area like $RV_R$ $(t_1)$<$RV_R(t_2)$ <$RV_R$ $(t_3)$. In step #9 in FIG. 10, image processing workstation 3 may display, side by side, the three display images simultaneously or in a motion picture like manner by switching the images in a time series manner at a predetermined time interval. Further, as schematically illustrated in FIG. 12, lesion areas RL (t$_1$) RL (t$_2$) RL (t$_3$) and the associated parenchymal areas RV$_R$(t$_1$), RV$_R$(t$_2$) RV$_R$(t$_3$) at the respective time points may be displayed in one image in a superimposing manner by changing the color or density for each time point.

In this way, when the growth condition EC is defined as an enlargement factor of lesion area at each of a plurality of time points, the treatment target area for the lesion may be considered by predicting the growth of the lesion area RL in a stepwise manner.

If it is evident, as clinical knowledge, that the detection target lesion does not grow over the boundary of two or more lung lobes, it is preferable, in the second embodiment, that the lung field area LF is separated into lung lobes (five lobes of right upper lobe, right middle lobe, right lower lobe, left upper lobe, and left lower lobe), and lesion area enlargement unit 38 does not enlarge the lesion area RL over the boundary of the lung lobes. Here, the separation method may be automatic or manual. As for the automatic separation method, any known method may be employed, such as a method in which locations of interlobar fissures are roughly identified using structural information of trachea, bronchi, pulmonary blood vessel, then the interlobar fissures are extracted using density information, and lung lobes are separated based on the extracted interlobar fissures. (For details, refer to a literature "Development of the Procedure for Automatic Extracting Interlobar Fissures and its Performance Evaluation" by T. Hayashi et al., Technical Report of IEICE, MI2003-53(2003-10), Medical Image, Oct. 31, 2003, Vol. 103, No. 409, pp. 39-44, [Date of Retrieval: Jan. 1, 2010], Internet, <URL: http://www.fjt.info.gifu-u.ac.jp/publication/328.pdf>, (hereinafter, Reference Documents 2.)

In the second embodiment, the lesion area itself is enlarged, but, as a more simplified method, the associated blood vessel structure LV$_R$ may be extended to the proximal side of the pulmonary blood vessel structure LV according to the growth condition and the associated lung parenchymal area RV$_R$ may be identified by associated lung parenchymal area identification unit 36 based on the extended associated blood vessel structure.

Figure 13:
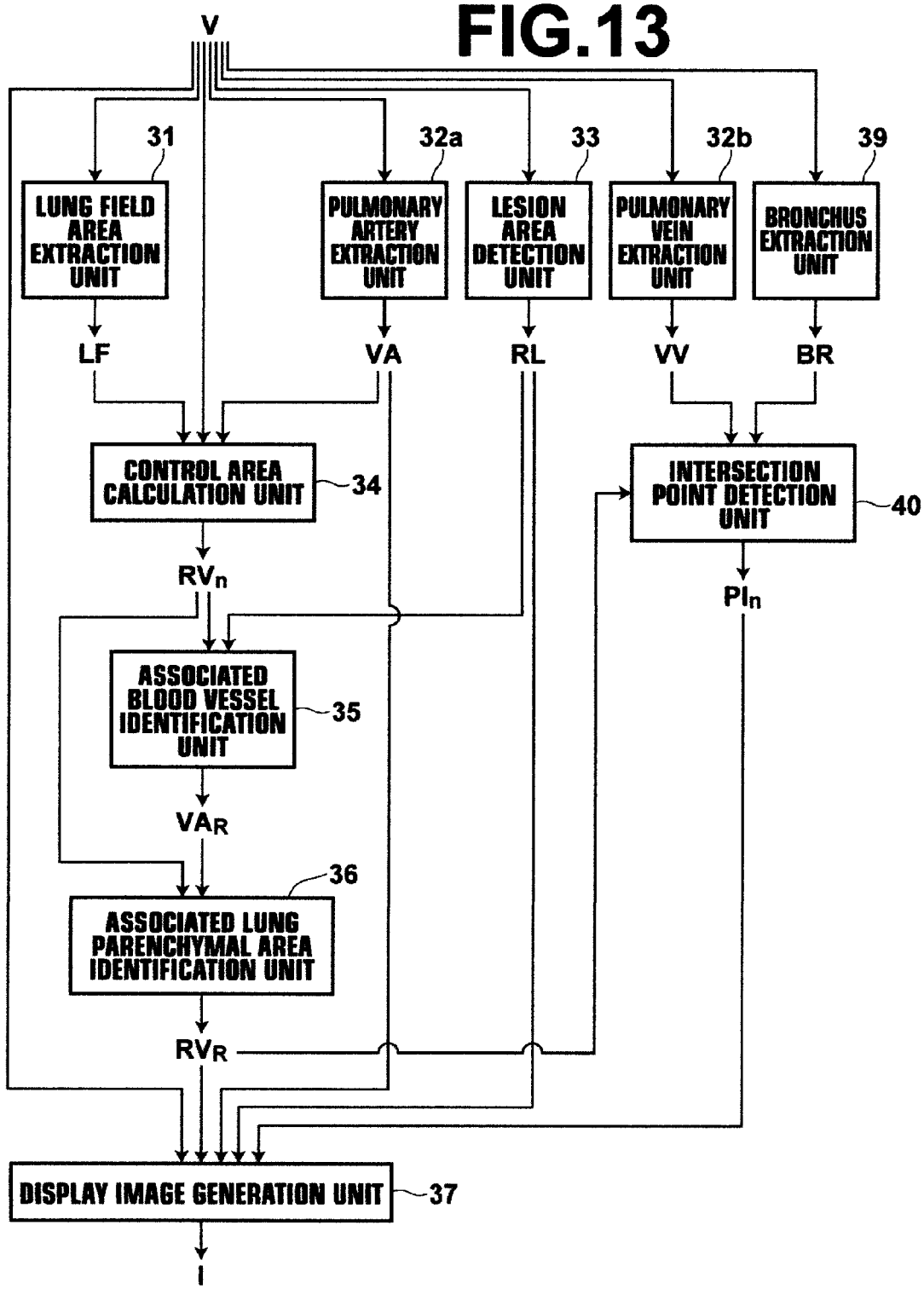
FIG. 13 is a block diagram schematically illustrating a configuration and a process flow for realizing a medical image diagnosis assisting function in a third embodiment of the present invention.

FIG. 13 is a block diagram illustrating a portion of the function of image processing workstation 3 relevant to the medical image diagnosis assisting process according to a third embodiment of the present invention. As shown in FIG. 13, in the third embodiment of the present invention, pulmonary blood vessel extraction unit 32 in the first embodiment is replaced with pulmonary artery extraction unit 32a, and pulmonary vein extraction unit 32b, bronchus extraction unit 39 and intersection point detection unit 40 are added to the configuration of the first embodiment.

That is, in the first embodiment, pulmonary blood vessel extraction unit 32 extracts a pulmonary blood vessel structure without making distinction between the pulmonary artery and pulmonary vein. But in the present invention, pulmonary artery extraction unit 32a extracts a pulmonary artery structure VA and pulmonary vein extraction unit 32b extracts a pulmonary vein structure VV. More specifically, if pulmonary artery extraction unit 32a and pulmonary vein extraction unit 32b are configured to accept seed point setting on the pulmonary artery and pulmonary vein respectively, the subsequent processing is identical to that of pulmonary blood vessel extraction unit 32. Otherwise, the pulmonary artery and pulmonary vein may be extracted as a pulmonary blood vessel structure without distinction and the extracted pulmonary blood vessel structure may be divided into the pulmonary artery and pulmonary vein. For example, a method that focuses attention on the fact that the pulmonary artery and bronchus run in parallel near the center of each section of the lung while the pulmonary vein runs near the boundary of each section of the lung, that is, between the bronchi is known. In the method, the extracted pulmonary blood vessel structure is broken down into a plurality of branch blood vessel groups based on the contact relationship between blood vessels and a bronchus is also extracted using a known method. Then, using the extracted bronchus as a kernel point mass, three-dimensional Voronoi division is performed to estimate a boundary plane of lung segments, then an average distance from the bronchus and an average distance from the boundary plane are calculated for each branch blood vessel group, and a branch blood vessel group located close to the bronchus and away from the boundary plane of lung sections is classified into the pulmonary artery, while a branch blood vessel group located away from the bronchus and close to the boundary plane of lung sections is classified into the pulmonary vein (for details, refer to Reference Document 1 described above).

As in pulmonary extraction unit 32, bronchus extraction unit 39 performs region growing based on an arbitrary seed point set by the user to extract a mass of pixels within bronchi, then performs a thinning process on the extracted bronchus area, and based on the connection relationship of the obtained thin line representing bronchi, each pixel on the thin line is classified into an end point, an edge (side), or a branching point, whereby tree-structure data BR representing the bronchi can be obtained.

Intersection point detection unit 40 detects an intersection point PI$_n$ between the associated lung parenchymal area RV$_R$ and pulmonary vein structure VV or the bronchus structure BR. More specifically, each of the pulmonary vein structure VV and bronchus structure BR is searched from the proximal portion toward the distal end, then a determination is made as to whether or not each searched point is a point belonging to the associated lung parenchymal area RV$_R$, and a point where the determination result changes from outside to the inside of the area is detected as the intersection point Pi$_n$.

Control area calculation unit 34 uses the pulmonary artery structure VA instead of the pulmonary blood vessel structure LV, and associated blood vessel identification unit 35 identifies an associated pulmonary artery structure VA$_R$ instead of the associated pulmonary blood vessel structure LV$_R$.

Figure 15:
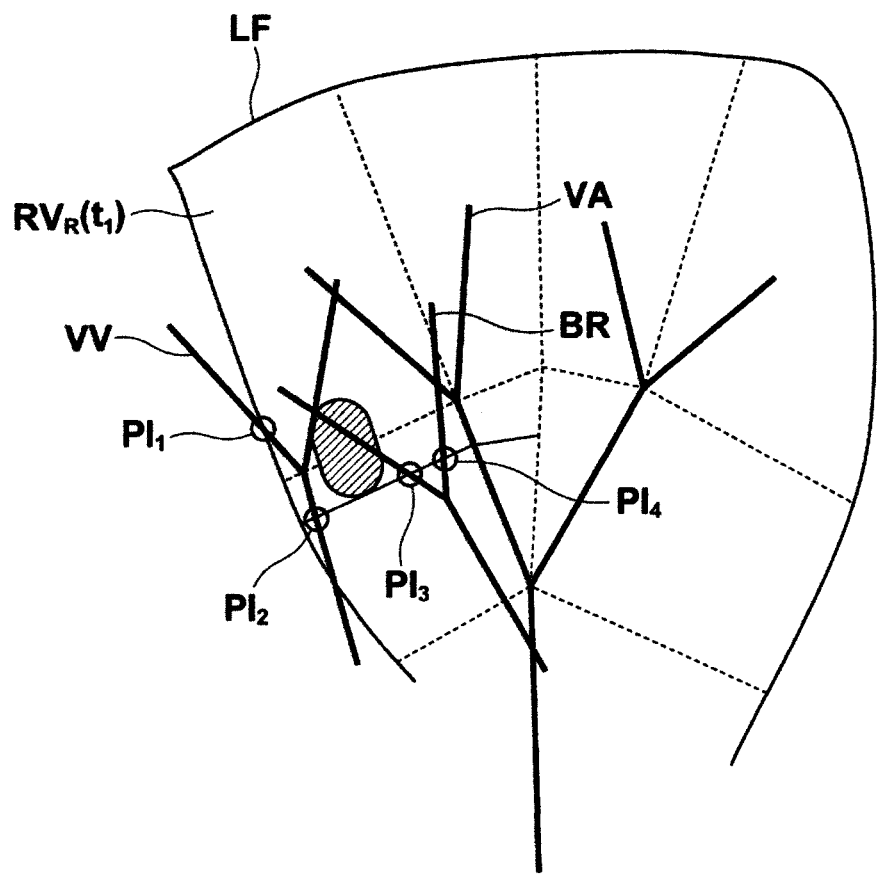
FIG. 15 schematically illustrates an example of display image visualizing an intersection point between the associated lung parenchymal area, identified based on the lesion area, and pulmonary vein or bronchus.

Further, as schematically illustrated in FIG. 15, display image generation unit 37 generates, from the three-dimensional medical image V, a display image I which represents an area including not only the lesion area RL, a pulmonary artery structure from the associated pulmonary artery structure VA$_R$ to the periphery and an adjacent pulmonary artery structure, and the associated lung parenchymal area RV$_R$ but also the pulmonary vein structure VV and bronchus structure BR, in which the lesion area RL, the associated lung parenchymal area RV$_R$, and intersection point PI$_n$ are represented in an identifiable manner. More specifically, mask data representing each of lesion area RL, pulmonary artery structure from the associated pulmonary artery structure LV$_R$ to the periphery and an adjacent pulmonary artery structure, and associated lung parenchymal area RV$_R$, pulmonary vein structure W, bronchus structure BR, and intersection point PI$_n$ and a template that defines color or opacity of each of them are provided in advance. Then, using the mask data and template, a known volume rendering process is performed on the three-dimensional medical image V and ray casting is performed on each area masked by the mask data with a color or opacity allocated to the structure of each masked area, whereby the display image I is generated.

Figure 14:
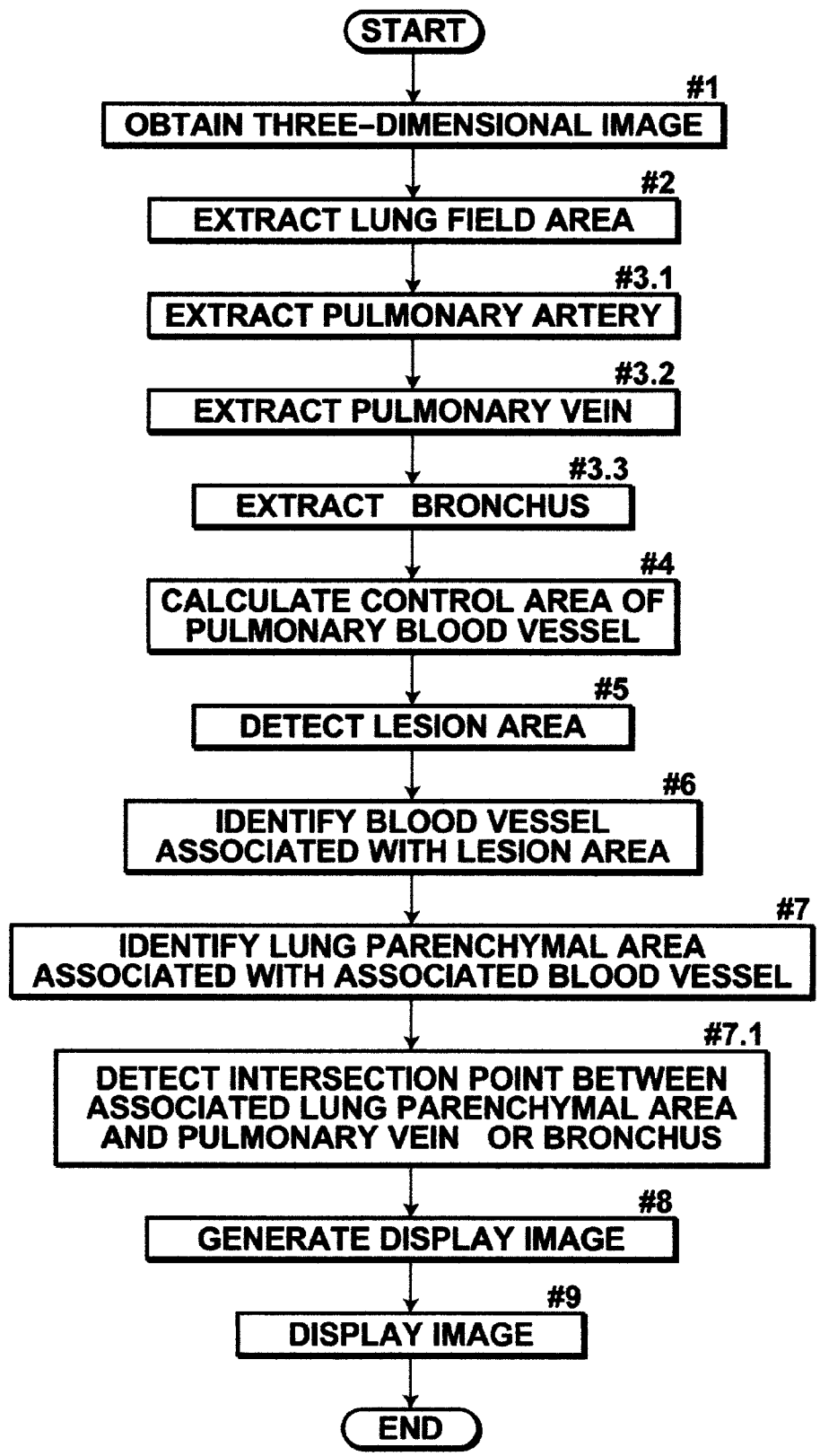
FIG. 14 is a flowchart illustrating a process flow for assisting medical image diagnosis using medical image diagnosis system in the third embodiment of the present invention.

FIG. 14 is a flowchart illustrating a flow of medical image diagnosis assisting process according to the third embodiment of the present. As shown in FIG. 14, steps #1, #2 are identical to those of the first embodiment, and instead of step #3 in the first embodiment, pulmonary artery extraction unit 32a extracts the pulmonary artery VA (step #3.1). Further, pulmonary vein extraction unit 32b extracts the pulmonary vein VV (step #3.2), and bronchus extraction unit 39 extracts the bronchus structure BR (step #3.3). Then, steps #4 to #7 are identical to those of the first embodiment, and after step #7, intersection point detection unit 40 detects an intersection point $PI_n$ between the associated lung parenchymal area $RV_R$ and pulmonary vein structure VV or bronchus structure BR (step #7.1). The subsequent process steps are identical to those of the first embodiment.

As described above, in the third embodiment of the present invention, intersection point detection unit 40 detects an intersection point $PI_n$ between the associated lung parenchymal area $RV_R$ and pulmonary vein structure VV or bronchus structure BR. When resecting an associated lung parenchymal area $RV_R$ including a lesion area RL, this allows a point to be sutured or inosculated on the pulmonary vein or bronchi to be understood easily.

Further, in the lung parenchyma, gas exchange in the blood occurs with both the pulmonary artery and pulmonary vein. Therefore, if both the pulmonary artery and pulmonary vein are extracted by pulmonary blood vessel extraction unit 32 without distinction and a control area is calculated by control area calculation unit 34 using both the pulmonary artery and pulmonary vein, as in the first embodiment, the lung parenchymal area is divided into a control area controlled by the pulmonary artery and a control area controlled by the pulmonary vein, resulting in a division improper to the lung parenchyma function. Consequently, as in the present embodiment, when only a pulmonary artery structure is extracted using pulmonary artery extraction unit 32a instead of pulmonary blood vessel extraction unit 32, a division of the lung parenchymal area which is highly consistent with the lung parenchyma function may be achieved, although it may be necessary to separately identify an associated lung parenchymal area for each of the pulmonary artery and pulmonary vein. In the block diagram of FIG. 13, exchanging between pulmonary artery extraction unit 32a and pulmonary vein extraction unit 32b allows identification of an associated parenchymal area by focusing attention on the pulmonary artery.

The embodiments described above are illustration purposes only and many not be construed as limiting the scope of the technical scope of the present invention.

It should be appreciated that various modifications and changes made to the system configurations, processing flows, module structures, specific processing contents, and the like in the embodiments described above without departing from the spirit of the present invention are included in the scope of the present invention.

For example, with respect to the system configurations, a description has been made of a case in which various types of processing shown in FIGS. 2, 9, and 13 are performed by a single image processing workstation 3, but the system may be configured such that the various types of processing is distributed to a plurality of workstations and performed in cooperation with each other.

With respect to the processing flows, for example, in the flowchart of FIG. 3, steps #3/#4 and step #5 may be performed in parallel or they may be performed in the order of steps #5, #3, and #4. Likewise, in the flowchart of FIG. 10, steps #3/#4 and steps #5 and #5.1 may be performed in parallel or they may be performed in the order of steps #5, #5.1, #3, and #4. Also in the flowchart of FIG. 14, the order of steps #3.1, #3.2, #3.3 and #4 may be changed except that step #4 is performed after step #3.1, or steps #3.1, #3.2, and #3.3 may be performed in parallel. Further, the pair of steps #3.1 and #4, step #3.2, step #3.3, and step #5 may be performed in parallel or the order thereof may be changed.

With respect to the specific processing contents, lung field extraction unit 31 may extract a lung field area LF by other known extraction methods, such as the method proposed by the present applicant in Japanese Unexamined Patent Publication No. 2008-253293.

Likewise, pulmonary blood vessel extraction unit 32, pulmonary artery extraction unit 32a, pulmonary vein extraction unit 32b, and bronchus extraction unit 39 may employ various types of known extraction methods other than those described above. If, at that time, a tree-structure is obtained simultaneously with the extraction, the obtained tree-structure may be used directly in the subsequent processing without performing a thinning process.

In the first and second embodiments, pulmonary blood vessel extraction unit 32 may be configured to extract only either one of pulmonary artery and pulmonary vein or to extract bronchi, and an associated lung parenchymal area is identified based on the bronchus structure.

Also, lesion area extraction unit 33 may employ various types of known extraction methods other than that described above (e.g., methods described in Non-patent Document 3 and Patent-document 1). Further, an arrangement may be adopted in which a lesion area is detected in advance based on a three-dimensional medical image captured under a different imaging condition from that of the three-dimensional medical image V, such as a three-dimensional medical image of a different imaging phase, a three-dimensional medical image captured by a different modality, or a three-dimensional medical image captured using a contrast agent, or a three-dimensional medical image processed with a different processing parameter, then a positional alignment is performed between the different three-dimensional medical image and the three-dimensional medical image V to align the positions of the internal structures of the subject, and based on the positional alignment result, an area of the three-dimensional medical image V corresponding to the lesion area of the different three-dimensional medical image is detected as the lesion area RL by lesion area extraction unit 33. A specific positional alignment method that can be used is any of known nonrigid registration methods which include a method in which corresponding two points are specified by the user and a method that performs alignment based on the image contrast without using a landmark (for more details, refer to Japanese Unexamined Patent Publication No. 2005-028121 and a literature "Nonrigid Registration Using Free-Form Deformations: Application to Breast MR Images" by D. Rueckert et al., IEEE Transactions on Medical Imaging, Vol. 18, No. 8, pp. 712-721, 1999 and the like). Further, bronchi may be extracted when nonrigid registration is performed and the extracted bronchi may be used as the landmark.

Control area calculation unit 34 may be configured to obtain one control area $RV_n$ for one group constituting a plurality of branch blood vessels or to further divide one branch blood vessel and obtain a control area $RV_n$ for each divided portion of the branch blood vessel, instead of obtaining a control area $RV_n$ for each branch blood vessel. Further, the control area $RV_n$ may be obtained based not only on the distance between a pixel in a lung field area LF and a branch blood vessel but also on a characteristic amount such as a blood vessel diameter and the like stored in tree-structure data of the pulmonary blood vessel structure LV.

When a control area $RV_n$ is obtained by performing Voronoi division on the entire lung field area LF, the control area may cross over a boundary of lung lobes, so that control area calculation unit 34a may separate the lung field area LF into lung lobes in advance based on the method described in Reference Document 2 and may calculate the control area $RV_n$ within each lung lobe. A pulmonary blood vessel never interact with the lung parenchyma in two or more lung lobes, so that limiting of the extent of control area $RV_n$ within each lung lobe in the manner as described above allows appropriate identification, which is consistent with the anatomical structure of a lung, of the associated blood vessel and associated lung parenchymal area to be made.

The display image I generated by display image generation unit 37 may be an image other than a volume rendering image, such as a MPR image or the like.

In the aforementioned embodiments, the description has been made of a case in which the examination and evaluation target is a human lung, but other structures having a branch structure and a peripheral structure functionally associated with the branch structure, such as a liver, may be the examination and evaluation target.

What is claimed is:

1. A medical image diagnosis assisting apparatus, comprising:
   an abnormal peripheral structure detection means for detecting, from a three-dimensional medical image representing a subject's internal structure having a branch structure and a peripheral structure which is a structure located in a periphery of the branch structure and functionally associated with the branch structure, an abnormal peripheral structure which is an abnormal portion of the peripheral structure;
   a branch structure extraction means for extracting the branch structure from the three-dimensional medical image;
   an association identification means for identifying a point in the branch structure functionally associated with each point in the peripheral structure based on position information of each point in the extracted branch structure and for obtaining a control area of each branch of the extracted branch structure based on the identified functional correspondence between each point in the peripheral structure and each point in the branch structure;
   an associated branch structure identification means for identifying a portion of the branch structure functionally associated with the abnormal peripheral structure as an associated branch structure based on the obtained control area of each branch of the extracted branch structure; and
   an associated peripheral structure identification means for identifying a portion of the peripheral structure functionally associated with the identified associated branch structure as an associated peripheral structure based on the obtained control area of each branch of the extracted branch structure and the identified associated branch structure,
   wherein the associated peripheral structure is an area functionally associated with the branch structure from the associated branch structure to a periphery leading from the associated branch structure.

2. The medical image diagnosis assisting apparatus of claim 1, wherein:
   the apparatus further comprises an abnormal peripheral structure enlargement means for enlarging the abnormal peripheral structure according to a given growth condition representing a degree of future growth of the abnormal peripheral structure; and
   the associated branch structure identification means identifies a portion of the branch structure functionally associated with the abnormal peripheral structure after the enlargement as the associated branch structure.

3. The medical image diagnosis assisting apparatus of claim 2, wherein:
   the given growth condition represents a plurality of growth steps;
   the abnormal peripheral structure enlargement means enlarges the abnormal peripheral structure with respect to each growth step;
   the associated branch structure identification means identifies the associated branch structure with respect to each growth step;
   the associated peripheral structure identification means identifies the associated peripheral structure with respect to each growth step; and
   the apparatus further comprises a means for generating, from the three-dimensional medical image, one or more images which represent at least the associated peripheral structure and the associated branch structure, and indicate a change in the associated peripheral structure between each of the growth steps in a visually recognizable manner.

4. The medical image diagnosis assisting apparatus of claim 3, wherein the one or more images further indicate a change in the abnormal peripheral structure between each of the growth steps in a visually recognizable manner.

5. The medical image diagnosis assisting apparatus of claim 1, wherein the associated branch structure identification means extends the portion of the branch structure functionally associated with the abnormal peripheral structure to the proximal side of the branch structure according to a given growth condition representing a degree of future growth of the abnormal peripheral structure and identifies the portion after the extension as the associated branch structure.

6. The medical image diagnosis assisting apparatus of claim 1, wherein the associated peripheral structure identification means identifies a portion of the peripheral structure functionally associated with the portion of the branch structure functionally associated with the abnormal peripheral structure and a portion of the branch structure on the distal side of the portion functionally associated with the abnormal peripheral structure as the associated peripheral structure.

7. The medical image diagnosis assisting apparatus of claim 1, wherein:
   the subject's internal structure comprises a second branch structure different from the branch structure; and
   the apparatus further comprises a second branch structure extraction means for extracting the second branch structure from the three-dimensional medical image and an intersection point detection means for detecting an intersection point between a boundary plane of the associated peripheral structure and the second branch structure.

8. The medical image diagnosis assisting apparatus of claim 7, further comprising a means for generating, from the three-dimensional medical image, an image which represents at least the associated peripheral structure, the associated branch structure, and the second branch structure adjacent to the two structures, and indicates the intersection point in a visually recognizable manner.

9. The medical image diagnosis assisting apparatus of claim 1, wherein the subject's internal structure is a lung and the branch structure is a blood vessel or a bronchus.

10. The medical image diagnosis assisting apparatus of claim 1, wherein the subject's internal structure is a liver and the branch structure is a blood vessel.

11. A medical image diagnosis assisting method, comprising the steps of:

detecting, from a three-dimensional medical image representing a subject's internal structure having a branch structure and a peripheral structure which is a structure located in a periphery of the branch structure and functionally associated with the branch structure, an abnormal peripheral structure which is an abnormal portion of the peripheral structure;

extracting the branch structure from the three-dimensional medical image;

identifying a point in the branch structure functionally associated with each point in the peripheral structure based on position information of each point in the extracted branch structure and obtaining a control area of each branch of the extracted branch structure based on the identified functional correspondence between each point in the peripheral structure and each point in the branch structure;

identifying a portion of the branch structure functionally associated with the abnormal peripheral structure as an associated branch structure based on the obtained control area of each branch of the extracted branch structure; and identifying a portion of the peripheral structure functionally associated with the identified associated branch structure as an associated peripheral structure based on the obtained control area of each branch of the extracted branch structure and the identified associated branch structure, wherein the associated peripheral structure is an area functionally associated with the branch structure from the associated branch structure to a periphery leading from the associated branch structure.

12. A non-transitory computer readable recording medium on which is recorded a medical image diagnosis assisting program for causing a computer to perform the steps of:

detecting, from a three-dimensional medical image representing a subject's internal structure having a branch structure and a peripheral structure which is a structure located in a periphery of the branch structure and functionally associated with the branch structure, an abnormal peripheral structure which is an abnormal portion of the peripheral structure;

extracting the branch structure from the three-dimensional medical image;

identifying a point in the branch structure functionally associated with each point in the peripheral structure based on position information of each point in the extracted branch structure and obtaining a control area of each branch of the extracted branch structure based on the identified functional correspondence between each point in the peripheral structure and each point in the branch structure;

identifying a portion of the branch structure functionally associated with the abnormal peripheral structure as an associated branch structure based on the obtained control area of each branch of the extracted branch structure; and identifying a portion of the peripheral structure functionally associated with the identified associated branch structure as an associated peripheral structure based on the obtained control area of each branch of the extracted branch structure and the identified associated branch structure, wherein the associated peripheral structure is an area functionally associated with the branch structure from the associated branch structure to a periphery leading from the associated branch structure.

13. A medical image diagnosis assisting apparatus, comprising:

an abnormal peripheral structure detection means for detecting, from a three-dimensional medical image representing a subject's internal structure having a branch structure and a peripheral structure which is a structure located in a periphery of the branch structure and functionally associated with the branch structure, an abnormal peripheral structure which is an abnormal portion of the peripheral structure;

a branch structure extraction means for extracting the branch structure from the three-dimensional medical image;

an associated branch structure identification means for identifying a portion of the branch structure functionally associated with the abnormal peripheral structure as an associated branch structure based on position information of each point in the extracted branch structure; and an associated peripheral structure identification means for identifying a portion of the peripheral structure functionally associated with the identified associated branch structure as an associated peripheral structure based on the position information of each point in the extracted branch structure, wherein the subject's internal structure comprises a second branch structure different from the branch structure; and the apparatus further comprises a second branch structure extraction means for extracting the second branch structure from the three-dimensional medical image and an intersection point detection means for detecting an intersection point between a boundary plane of the associated peripheral structure and the second branch structure.

* * * * *